Feb. 10, 1970     W. W. CLARKE ET AL     3,494,464
ROTARY WASHER FOR FILTER BEDS
Filed Nov. 14, 1967     5 Sheets-Sheet 1
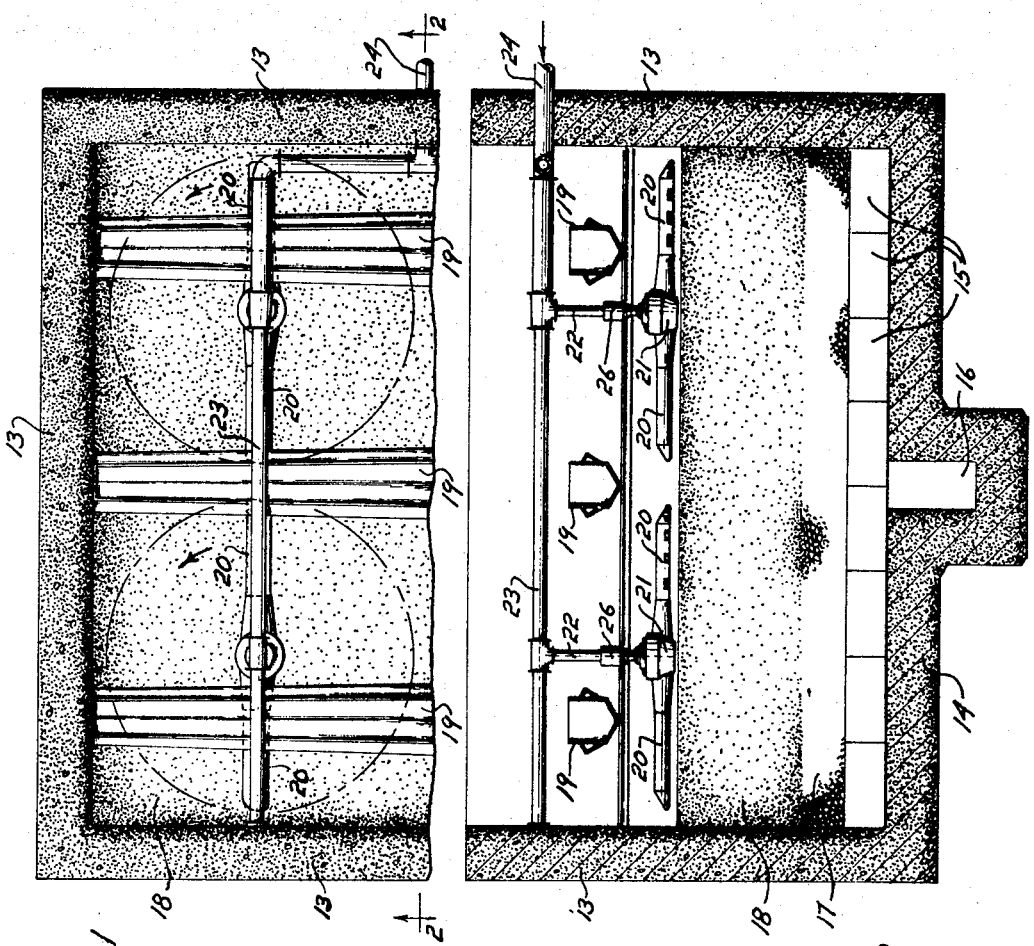
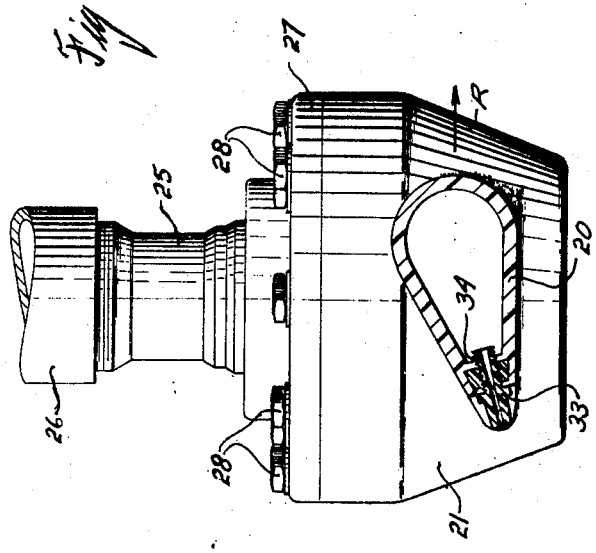
INVENTOR.
WARD W. CLARKE
LEONARD S. MEYER
BY
ATTORNEYS

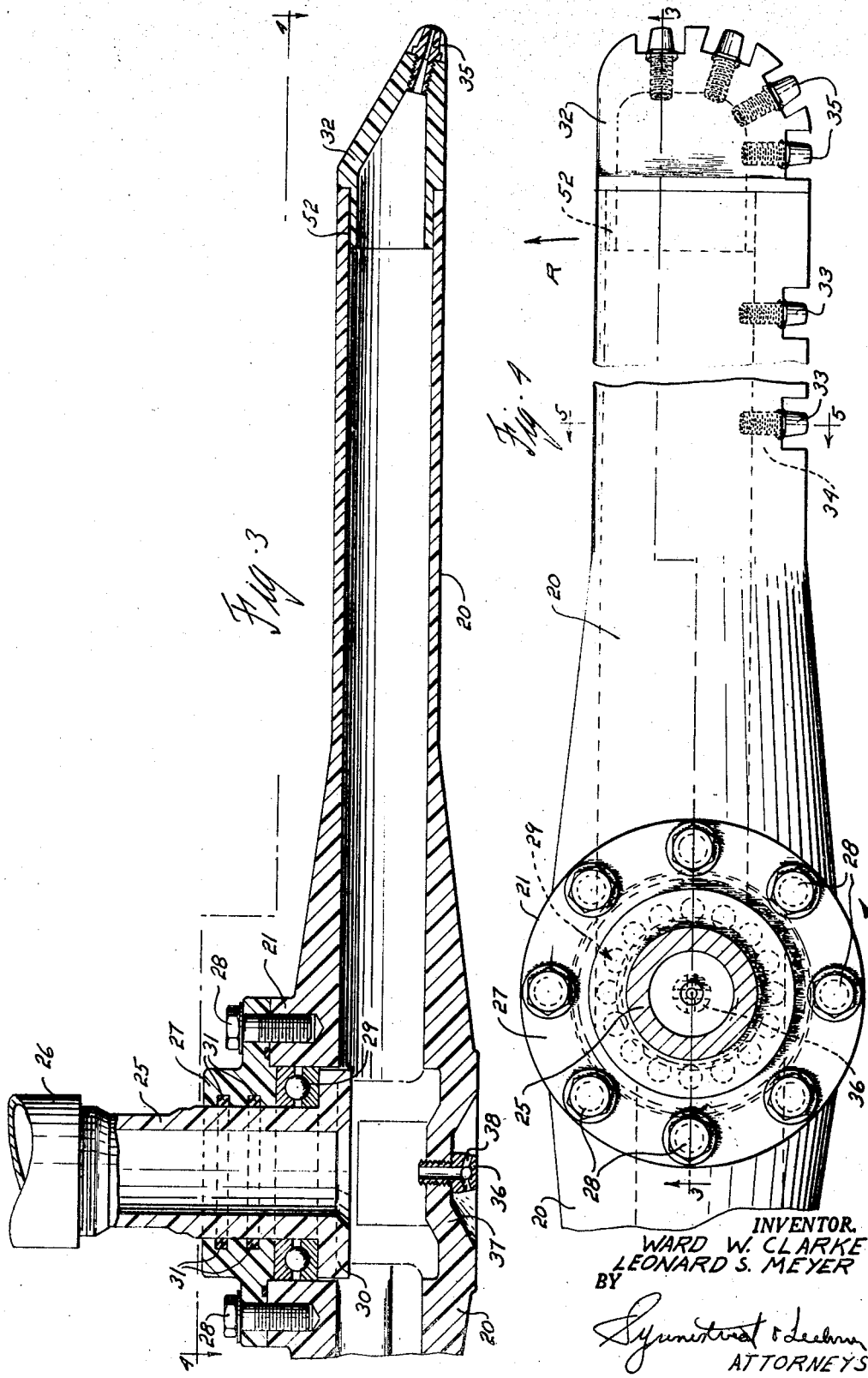

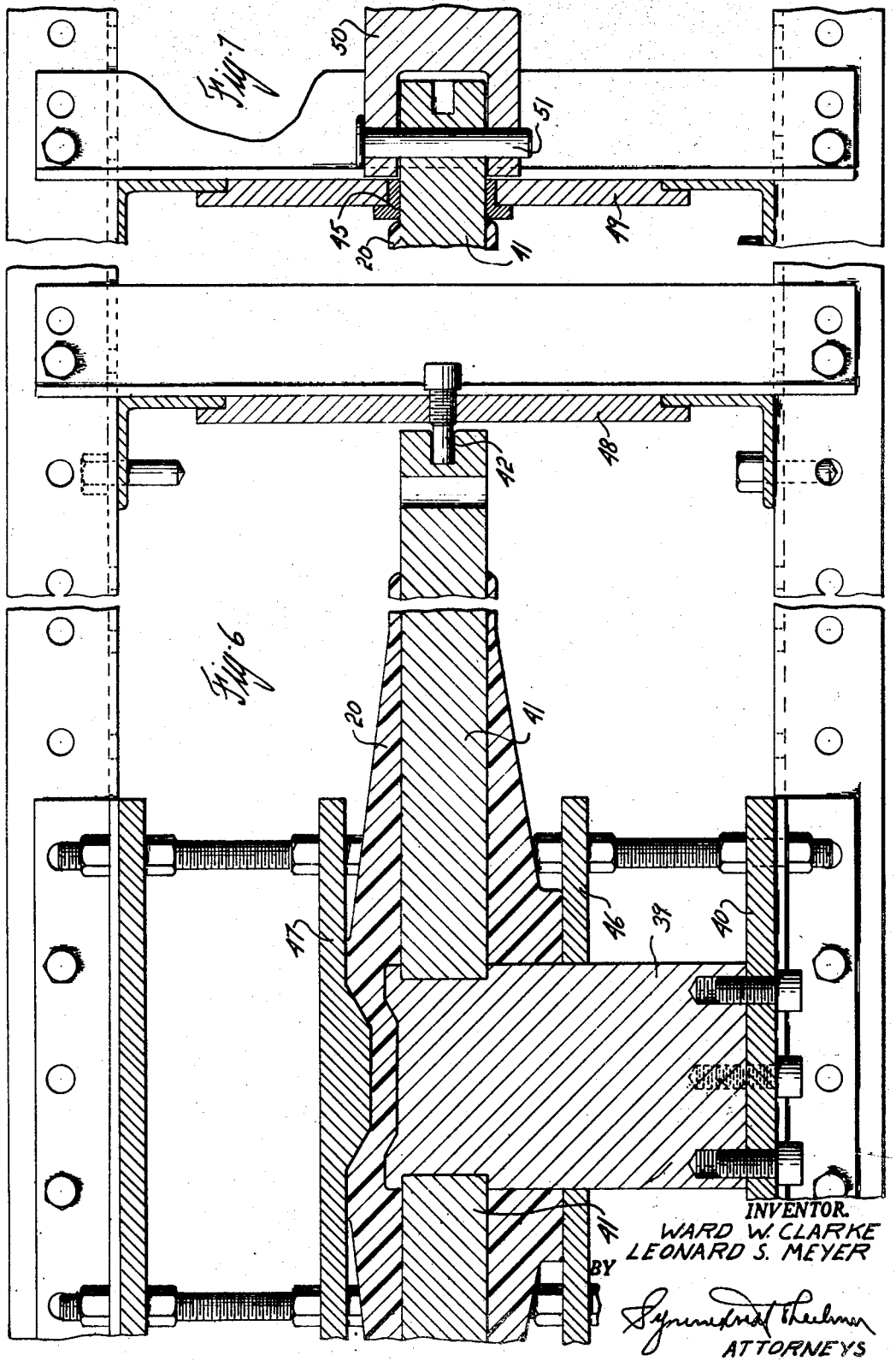

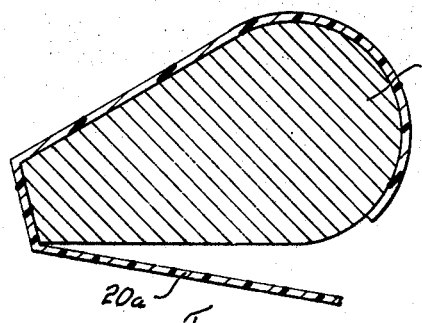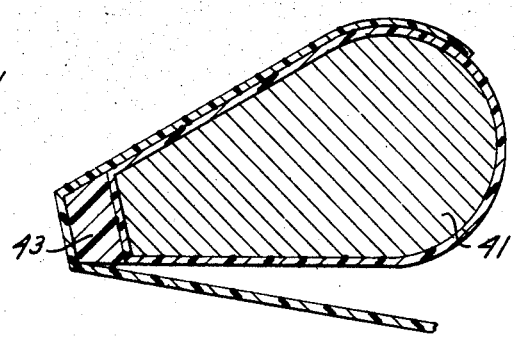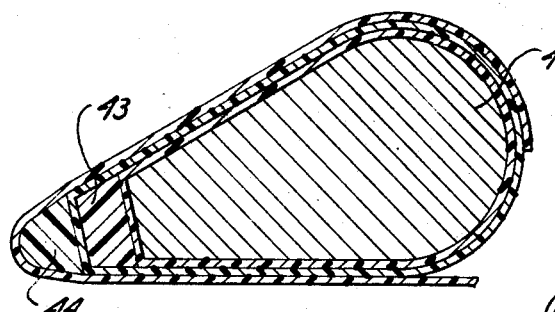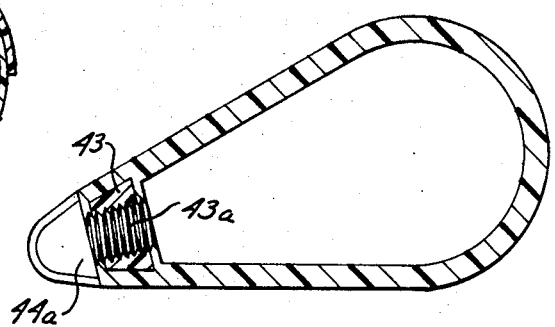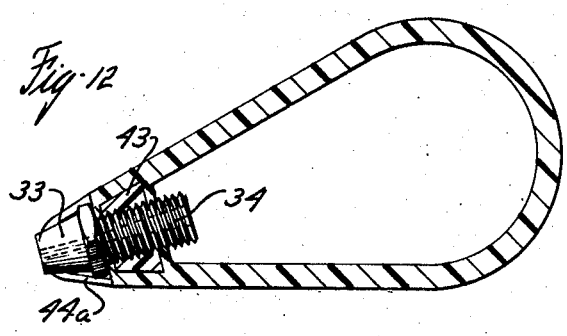

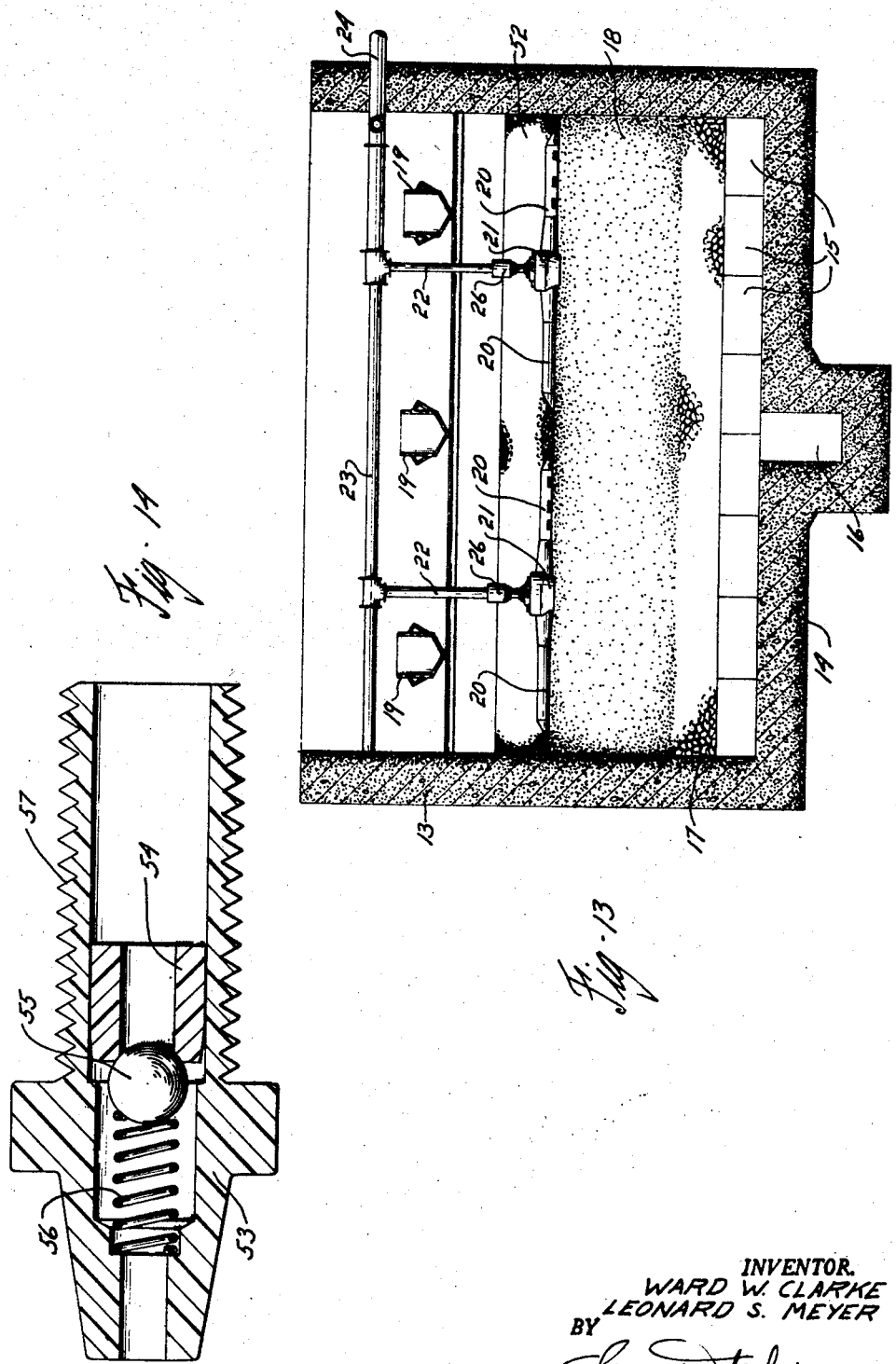

United States Patent Office 3,494,464
Patented Feb. 10, 1970

3,494,464
ROTARY WASHER FOR FILTER BEDS
Ward W. Clarke, Zelienople, Pa., and Leonard S. Meyer, Columbia, S.C., assignors to F. B. Leopold Company, Inc., Zelienople, Pa., a corporation of Delaware
Filed Nov. 14, 1967, Ser. No. 682,827
Int. Cl. B01d 35/16, 23/16
U.S. Cl. 210—136     12 Claims

ABSTRACT OF THE DISCLOSURE

Filtering apparatus including rotary washer for granular material of filter beds, the washers being adapted for use either above or submerged in filtering media and comprising rotatively mounted arms formed of resin material, each arm having a streamlined cross sectional shape and having an interior hollow for washing liquid, together with liquid nozzles inset in the trailing edge of the streamlined shape, and method for making such rotary washers.

---

This invention relates to equipment for use in the washing of filter beds, and especially for use in the washing of sand and other granular filtering media provided in one or more layers supported upon coarser pieces, such as gravel, in a filter bed.

In filter beds of this type, in which water or other liquid to be filtered is delivered to the upper surface of the filter bed, when dirt and foreign material filtered from the liquid accumulate, the principal zone of such accumulation lies adjacent the upper surface or in the upper layers of the bed. For the purpose of cleaning the filter, it is known to "back wash" the bed, by introducing cleaning liquid, usually water, into the bottom of the bed so as to flow upwardly through the several layers of which the bed is composed. This back wash water is then permitted to flow off, carrying with it dirt and foreign matter to be removed from the bed. It is also known to provide rotary devices for washing and agitating the granular material of the filter bed during the back wash. For this purpose washers comprising arms radiating from a central hub or axle are frequently positioned to rotate in a plane just above the surface of the granular material when the flow direction through the filter bed is in the normal downward filtering direction. Upon back washing the layer of granular material becomes suspended in the back washing liquid and a higher level is established such that the rotating arms of the agitator and washer lie within the suspension of granular material and back washing liquid. Rotation of the rotary washer then serves to agitate the granular material being washed.

Moreover, a supply of additional washing liquid is commonly introduced through the axis of the washer and thence through the rotating arms, this liquid being discharged through nozzles carried by the arms in order to provide a scrubbing action which further augments the cleaning action.

The present invention is concerned with certain improvements in rotary washing and agitating devices of the kind above mentioned, and one of the principal objectives of the invention is to provide for reduction of wear upon such rotary washers, wear being a considerable problem because of the abrasive action of the granular material upon the rotating arms of the washer and also upon the liquid delivery nozzles carried by the rotating arms. For this general purpose and objective, the preferred embodiment of the invention contemplates the concurrent employment of two features:

First, formation of the rotary washer, or at least the rotating arms thereof, of resin material, preferably fiber reinforced resin material, and second shaping the arms to have a streamlined cross section, with a relatively blunt leading edge and relatively sharp trailing edge. By forming the arms of resin material and by using arms having a streamlined cross section with a relatively blunt leading edge and relatively sharp trailing edge, the liquid flow patterns established over the surfaces of the washer arms when rotating in the suspension of the granular material in the back wash water, causes the abrasive particles in the suspension to follow paths along the contours of the arms, rather than impinging against the surfaces of the arms, so that this streamlined shape aids in reducing abrasion and wear. For the purpose of minimizing abrasion of the nozzles, the invention contemplates provision of recesses in the trailing edge of the streamlined rotary arms of the washer, so as to accommodate the nozzles within the streamlined cross sectional contour of the arm. In this way, the abrasion of the nozzles is greatly diminished, in view of which it becomes practicable to employ nozzles formed of certain resin materials as it preferred in accordance with the present invention.

The construction, particularly the streamlined cross section of the arms of the rotary washers according to the present invention, affords still another important advantage. This additional advantage is especially related to the type of filter bed incorporating a plurality of filtering media, for instance a layer of sand having a layer of crushed anthracite coal overlying the sand. In such a filter bed, because of the construction of the rotary washers of the present invention, it is possible to locate the washers so as to rotate substantially in the plane of the interface between the different filtering media. This provides for more effective washing action in the case of a multiple media filter bed in which larger dirt particles have a tendency to accumulate on and in the upper layer, for instance the crushed anthracite, and fine dirt particles have a tendency to accumulate at the interface between the upper layer and the underlying sand.

A further object of the invention is the substantial elimination of both corrosion and electrolysis problems which have heretofore been encountered with rotary washers, which have customarily been formed of various metals. With this objective in view it is contemplated that the rotary washers be formed entirely or virtually entirely of resin materials. Thus it is contemplated that not only the washer arms, but also the rotative hub structure thereof, the wash water discharge nozzles, and even the spindle and mounting bearing, be formed of resin material.

How the foregoing objects and advantages are attained will appear more fully from the following description referring to the accompanying drawings which illustrate preferred embodiments of rotary washers arranged and constructed according to the present invention and also illustrating certain techniques which may be employed for producing such washers.

In the drawings, FIGURE 1 is a fragmentary plan view of a typical filter bed to which double armed rotary washers according to the present invention have been applied, with the washers located just above the filtering medium;

FIGURE 2 is a vertical sectional view taken as indicated by the section line 2—2 on FIGURE 1;

FIGURE 3 is a partial vertical sectional view, on an enlarged scale, taken through one of the rotary washers of the installation shown in FIGURES 1 and 2, with one of the arms of the washer broken away;

FIGURE 4 is a plan view taken as indicated by the line 4—4 on FIGURE 3;

FIGURE 5 is a transverse sectional view taken as indicated by the line 5—5 on FIGURE 4;

FIGURE 6 is a partial vertical sectional view through one of the rotary washers in the course of manufacture, with parts broken out, this view also showing certain molding equipment which may be utilized in making of the washers;

FIGURE 7 is a fragmentary view similar to the right hand portion of FIGURE 6 but illustrating the use of certain other parts which may be employed in the manufacturing operation;

FIGURES 8 to 12 are transverse sectional views through an arm of a washer illustrating a sequence of steps in the fabrication of a washer;

FIGURE 13 is a view similar to FIGURE 2 but illustrating an embodiment of the equipment in which rotary washers according to the present invention are employed in a multiple media filter bed and are positioned so as to rotate in a plane substantially at the interface of two of the filtering media; and FIGURE 14 is a longitudinal sectional view through a nozzle adapted to be used in any of the rotary washers disclosed, but especially adapted for use in the washers when employed as in FIGURE 13.

Referring first to FIGURES 1 and 2, a filter is there shown as built up within a concrete structure comprising walls 13 and a bottom 14. In the lower portion of this structure filter blocks such as indicated at 15 are employed, these blocks having flow passages therein which deliver the filtered water to the channel 16 for discharge from the filter. The blocks serve to support a layer of crushed stone or gravel 17 which, in turn, supports a sand or other granular filtering medium in a layer 18. During the normal filtering operation, the water or other liquid to be filtered is introduced through the troughs 19 from which the water overflows onto the top surface of the filter sand and thence percolates downwardly through the sand, and through the gravel, into the passages of the tile 15 at the bottom, ultimately leaving the filter through the duct 16.

During washing or cleaning of the filter, cleaning water is pumped into the duct 16, and thence flows in reverse sequence through the tile 15, the gravel layer 17, and the sand or other granular material 18 of the filter bed, thereby causing the bed to become "fluidized," with the sand particles suspended in the washing water and with the rotary agitators and washers described below submerged below the level of the suspension of the filter and in the washing water. The level of the suspension rises sufficiently to cause the separated dirt and foreign material accumulating on the surface to overflow into troughs 19, which are extended to one end of the filter in order to discharge the foreign material at a point outside the filter itself.

As will be seen from FIGURES 1 and 2, the rotary washers each comprise a pair of rotating arms 20 which, in this embodiment, are positioned at an elevation just above the top surface of the layer of sand 18 during the filtering action, at which time the liquid to be filtered enters through and overflows from the troughs 19 and descends to and through the sand layer for the purpose of effecting filtration. As mentioned above, the arms may be located in a plane substantially at the interface between different filtering media in a filter bed having two or more such media, and an embodiment of this kind is described more fully herebelow in connection with FIGURES 13 and 14.

Although the agitators and washers of the present invention may have any desired number of arms, two such arms constitute the preferred embodiment, and as will be seen from FIGURE 2, the pair of arms 20 of each washer radiate from a central hub structure 21, the hub being mounted at the lower end of an upright length of a liquid supply pipe 22 depending from the supply line 23 which may be formed as a branch of the washing liquid supply pipe 24.

The construction and arrangement of the washers will appear more fully from FIGURES 3, 4 and 5, now to be described.

Although the arms and the hub may be separately formed or molded, in the embodiment shown in the drawings, it will be seen that each arm 20 is hollow and is formed integrally with the hub 21 which is also hollow and the interior of which is in communication with the interior of the arms 20. A non-rotative axis member 25 is connected with the vertical pipe section 22 (see also FIGURE 2) by means of a coupling 26, this axis member 25 constituting a spindle or supporting element for the washer. The axis member 25 is further interiorly hollow in order to serve as a water flow connection between the vertical pipe section 22 and the interior of the hub 21, so that the washing liquid may be delivered to the interior of the arms 20.

The rotating washer device is mounted upon the axis member 25 by means of the bearing plate 27 which is connected with the hub of the washer by a series of bolts 28, a thrust bearing 29 being introduced between the bearing plate and the flange 30 of the axis member 25. Rotative sealing rings 31 are desirably interposed between the bearing plate 27 and the axis member 25, in order to preclude ingress of dirt and sand into the interior of the hub of the washer, and especially into the bearing 29.

Each washer arm 20 is provided with a tip 32 which is tapered radially outwardly to a relatively sharp edge, as clearly appears in FIGURE 3.

Attention is now called to the illustration in FIGURE 5, showing the streamlined cross sectional shape of the arm 20, having a rounded or blunt leading edge and a relatively sharp trailing edge, the direction of rotation being indicated in this figure by the arrow R and also by a similar arrow applied to FIGURE 4.

Advantageously the streamlined cross sectional contour of the arm 20 is arranged (see FIGURE 5) so that the mean chord line of the cross sectional shape is inclined upwardly in the direction of the blunt or leading edge. In view of this, during rotation of the arms, a slight "lift" is secured as a result of the motion of the arms through the suspension of the sand in the back wash water, and in consequence of this the load on the thrust bearing 29 is diminished.

Along the trailing or relatively sharp edge of each arm, nozzles 33 are provided, these nozzles having threaded shanks 34 positioned in complementarily threaded ports communicating with the interior hollow of the arm and extended rearwardly therefrom, so that the nozzles discharge washing liquid rearwardly of the arm. This produces a jet effect which acts as the driving force for rotating the washer during the washing operation.

Similar nozzles 35 are arranged in the arm tip 32, these tip nozzles being variously positioned at different angles ranging from a position directed rearwardly of the arm to a position directed radially outwardly of the arm, and in view of this, washing liquid is projected effectively over all surfaces or regions of the filter bed being washed.

A nozzle 36 (see FIGURE 3) is positioned in the closed end or bottom wall 37 of the hollow hub of the washer and is preferably provided with several discharge ports such as indicated at 38 for projecting wash water in several radial directions from the central region of the bottom of the washer. This also aids in effectively distributing the washing liquid in all regions of the filter bed.

Certain additional features of the structure of the rotary washer and its arms are explained hereinafter, following a description of one method for making the washers as illustrated in FIGURES 6 to 12.

In considering the fabrication of the washers, it is first pointed out that the washers are formed of resin material, preferably fiber reinforced resin material. Reinforcement fibers employed are preferably mineral fibers, most advantageously glass fibers. Although various resin materials may be used, in a typical case as herein disclosed, the resin material employed is a heat hardenable or thermosetting resin material, such as the polyester resins frequently referred to as polyester laminating resins. These resins are used initially in the A stage, i.e., in liquid form and the fibrous reinforcements are impregnated with the liquid resin, either before or after application of the reinforcements to or in the forms or molds used to shape the article. Heat is applied after the impregnated fibrous reinforcements are shaped to the desired form in order to cure the resin and solidify the article.

Although the washers according to the present invention may be made in a variety of different ways, for instance by forming parts in matched molds, one molding technique which may be utilized is illustrated in FIGURES 6 and 7. In considering these figures it should first be noted that the washer is there shown as being formed in an inverted position, as compared with the position in which it is used, as will readily be seen by comparison of FIGURE 6 with FIGURE 3.

A mandrel 39 for forming the interior of the hub of the washer is suitably mounted on a base 40, and a pair of arm forming cores 41 are supported at their outer ends by means of supporting studs such as shown at 42 toward the right of FIGURE 6. The inner ends of the cores 41 enter and are supported in recesses formed in the mandrel 39. With the mandrel and cores arranged as just described, plies of fibrous reinforcement, for instance glass fiber mat comprising randomly distributed glass fibers, are wound around the cores 41, for instance in the manner illustrated in FIGURES 8, 9 and 10 from which it will also be seen that the cores 41 have a cross sectional shape similar to the cross sectional shape of the arms, although the cores are cut off at the trailing edge in order to cooperate with certain additional pieces to be inserted, as is described below.

In an operation such as illustrated in FIGURES 8, 9 and 10, a ply 20a of glass fiber mat is wound around the core 41 and is then "doped" or saturated with the liquid resin. Another ply may then be wound on top of the first, as shown in FIGURE 9, and a third as shown in FIGURE 10.

For the purpose of securely mounting the spray nozzles in the manner to be described later, it is desirable that the arms incorporate certain structure in the trailing edges thereof in order to provide a substantial body of reinforced resin material in which to mount the nozzles. Although this may be accomplished in a number of ways, as by molding the desired body of resin in the trailing edge at the same time as molding the remainder of the arms, in the embodiment herein illustrated the body of resin is preformed in the form of one or more bars which are incorporated in the structure of the arm when the latter is molded. Thus, after application of the first ply as in FIGURE 8, a preformed bar of fiber reinforced resin material as indicated at 43 is positioned at the trailing edge of the core 41 and is enclosed within the structure by the next ply of fiber reinforcement. Similarly, another preformed fiber reinforced resin bar 44 positioned at the trailing edge is enclosed in the structure just prior to application of the third ply, as shown in FIGURE 10. Although the preformed bars 43 and 44 may be incorporated in the structure of the arms in various different ways, the illustration in the accompanying drawings shows one manner of accomplishing this and of providing for the embedding or bonding of the bars within the structure of the arms.

It will be understood that any desired number of plies may be used and further that the number of plies will vary in different regions of the arms and in different areas of the hub, as will be apparent from FIGURES 3 and 6, which show a total thickness which varies in different regions of the device being made.

Various layers of the reinforcements will of course be applied to various regions of the hub in a variety of positions, depending upon the shape of the part in local zones of the hub. It will be understood that liquid resin will be used and repeatedly applied, depending upon the build up of the fibrous reinforcement layers in various regions.

Moreover, the manner of use of reinforcement may be varied according to the nature of the method adopted for making the washers. In some instances the reinforcement fibers would not necessarily be utilized in the form of plies, but introduced as a preform approximating the shape of the article to be made which, if desired, may be enclosed within a mold, with liquid resin introduced for instance by evacuating the mold or by pressure feed of the resin, or by both. The particular technique to be employed may be varied for a number of reasons including the quantity of articles to be produced of a given size and shape.

For the kind of operation illustrated in FIGURES 6 to 12, for the purpose of accurately shaping certain parts of the exterior of the washer, certain external molding elements may also be utilized, in addition to the mandrel 39 and the cores 41. Thus the surface of the article to which the bearing plate 27 is to be applied is shaped by a molding plate 46, and the bottom of the hub is shaped by a molding plate 47 (which appears at the upper side of the piece as it is shown in FIGURE 6).

The plates 46 and 47 should be applied after the reinforcements and resin are applied, and these plates are preferably pressed into position as by adjusting nuts or the like, the details of which need not be considered herein.

After the piece has been formed and all mold parts are applied, the entire assembly is heated, for instance by placement in an oven in order to cure or harden the resin.

The solidified article may then be separated from the mold parts in any desired manner, as by removing the positioning stud 42 for each arm core to be removed and by replacing the supporting plate 48 by another plate 49 (see FIGURE 7) having a central aperture fitting the outside of the flanged collar 45 which is applied to the end portion of the arm core 41. A mechanism for pulling the core 41 out of the formed piece is then connected with the exposed end of the core. Such a puller is indicated at 50 in FIGURE 7 and is shown as being connected by pin 51 with the core 41, so that upon pulling on the core, the collar 45 will engage the end of the formed arm and thus retain the article in position during withdrawal of the core for that arm. The core 41 for the opposite arm may then be withdrawn and separated in a similar manner, and thereafter the hub mandrel 39 may be pulled out. Finally the plates 46 and 47 may be removed, and the piece is then ready for assembly with other parts.

Although in certain methods for making the washers the arms and arm tips may be formed integrally, in the embodiment illustrated, the arm tips 32 are separately molded of fiber reinforced resin material and are desirably provided with a shouldered inner end 52 adapted to interfit with the outer end of the arm 20, which would preferably be cut off or finished to an accurate surface adapted to mate with the tip. When separately made, the tips are advantageously adhesively bonded to the arms.

In the preferred practice of the invention the bearing plate 27 is also preferably formed of resin material, for instance fiber reinforced polyester resin material. Moreover, the axis member 25 is preferably formed of resin material, in the preferred practice of the invention this part being made of a polyvinyl chloride resin, without fiber reinforcement. Although the thrust bearing between the spindle 25 and the hub of the washer may also be formed of resin material, for instance polytetrafluoroethylene bearing rings, as shown in the drawings a ball type thrust bearing made for example of stainless steel may also be utilized. In equipment where it is of maximum importance to eliminate all metal, not only the thrust bearings may be formed of resin material but even the bolts 28 may be formed of resin material. Advantageously bolts of that type may be machined from nylon rod stock, such as polyhexamethylene adipamide. Extensive use of plastic or resin materials as described above is of advantage in installations where it is of importance to reduce corrosion or electrolysis effects to a minimum.

The fluid delivery nozzles, such as nozzles 33, 35 and 36, may be made of various wear resistant materials. In the embodiment already described, it is assumed that these nozzles are formed of nylon, for instance polyhexamethylene adipamide. In connection with the mounting of the nozzles, attention is again directed to FIGURES 9 to 12 inclusive. After the arms have been formed, with both of bars 43 and 44 embedded and bonded in position by the final heating of the resin materials, recesses or cut outs are formed in the trailing edge of each arm to a depth corresponding to the width of the bar 44, such a recess being indicated at 44a in FIGURE 11.

Moreover, after formation of the recess, a threaded aperture 43a is provided in the bar 43 in order to receive the shank 34 of one of the nozzles. The nozzles are then screwed into position, for instance as shown in FIGURE 12.

A similar procedure is followed with reference to the nozzles 35 provided in the tip 32.

It will be observed that the recesses or cut outs in the trailing edge of the arm accommodate the nozzles within the overall streamlined cross sectional contour of the arm, this being desirable in order to minimize abrasion of the nozzles during operation.

In connection with the references herein to the use of "resin materials," it is to be understood that a number of different resin materials may be employed in the fabrication of various parts of the washer disclosed. Polyester resin has already been mentioned for use in making the hub and arms and bearing plate; polyvinyl chloride has been mentioned for use in making the supporting spindle; polyhexamethylene adipamide has been mentioned for use in making the nozzles and bolts for fastening the bearing plate; and polytetrafluoroethylene has been mentioned for use as a mounting bearing for the washer. Although other resins may be used, these are representative of resin materials which may be employed in achieving the objectives of the invention, for instance the substantial elimination of corrosion and electrolysis effects, while at the same time providing good wear resistance.

In connection with the illustration of the resin materials in various figures of the drawings, it will be noted that in some figures separate layers or laminations are indicated, whereas in other figures such laminations are not indicated. Thus, even though the particular method illustrated by FIGURES 8, 9 and 10 utilizes a plurality of laminations, such separate laminations are not also illustrated in FIGURES 3, 5, 6, 11 and 12. Moreover, as already noted, in certain methods by which various parts of the washers may be made, a multiplicity of laminations would not even be present.

Turning now to the embodiment of the invention as illustrated in FIGURES 13 and 14, it is to be kept in mind that in FIGURE 13 the filtering apparatus is of the multiple media type. Various of the parts shown in FIGURE 13 which are the same as certain parts in FIGURES 1 and 2 are identified by the same reference numerals. In FIGURE 13, however, it will be seen that the filter bed includes not only a layer of sand 18, as in the first embodiment, but also a layer of another filtering medium indicated at 52. It will also be observed that the arms 20 of the washers are positioned so as to rotate in a plane substantially at the interface between the layers 18 and 52.

In the embodiment of FIGURE 13, the construction of the washers is the same as that described above, although in this embodiment it is contemplated to employ washer nozzles of a somewhat different type. A typical nozzle for this purpose is illustrated in FIGURE 14. Here it will be seen that the nozzle comprises a body 53 having an insert 54 providing a seat for the ball check valve 55 which is normally urged to closed position by means of the spring 56. One end of the body 53 is threaded as indicated at 57 so that the nozzle may be threaded into an aperture in the trailing edge of one of the washer arms.

Various parts of the nozzle of FIGURE 14 may be made either of resin materials, for instance the body 53, sleeve 54 and ball 55 may all be made of nylon, or if desired the body may be made of a wear resistant metal such as tellurium-copper and internal parts may alternatively be made of stainless steel.

In considering the embodiments of FIGURES 13 and 14 it is pointed out that for certain purposes it is desirable to employ mixed or multiple media filters. Such filters may comprise two or more filtering media. In a typical example, such a mixed media filter utilizes a bed or layer of sand 18, for instance of particle size ranging from 0.45 to 0.55 mm., together with a top layer 52 over the sand, this top layer being formed of crushed anthracite coal having an effective particle size of from about 0.85 to 0.90 mm. The anthracite particles are thus roughly twice the size of the sand particles and since sand has a specific weight of about 100 lbs./cubic foot and the anthracite of about 52 lbs./cubic foot, during the backwashing operation the individual particles of each medium weight approximately the same and are suspended equally in the backwashing liquid. Therefore both may effectively be cleaned during the backwashing operation. During normal filtering, however, the anthracite particles will stratify above the sand.

With the arrangement of the present invention, because of the construction of the washers it is practical to locate the washers in a plane at the interface between the sand and anthracite media, and in consequence of this location more effective cleaning action is secured, as compared with multiple medium arrangements in which the washers are located above the uppermost layer or medium. This results not only in effective agitation of the anthracite layer at the top of the filter bed but also provides for effective agitation of the upper layers of the sand, and this prevents formation and accumulation of mud balls, scums, etc. over a prolonged period of operation.

Since in the arrangement of FIGURE 13 the rotary washers are operating completely within the filter media bed, it is important to provide against plugging of the nozzles, for instance at times when the nozzles are idle, i.e., between backwashing operations. According to the present invention this is accomplished by employing nozzles equipped with check valves, for example as shown in FIGURE 14. In a typical installation of this type it is contemplated that the check valve be arranged to open only upon increase of internal pressure within the arms above some predetermined pressure, for instance above about 5 p.s.i. This will assure that dirt and particles of the filter media will not enter the arms and thus impair cleaning operation.

Nozzles of this type containing check valves may also be employed if desired in other installations, but they serve the special purpose just referred to when the washers are positioned to rotate in a plane substantially at the interface between different media of the filter.

We claim:
1. A rotary washer for granular material in a filter bed, comprising a rotatively mounted arm formed of fiber reinforced resin material and having a streamlined cross section with a relatively blunt leading edge and a relatively sharp trailing edge, the arm having an interior hollow for washing liquid, and nozzles for the washing liquid communicating with said hollow and positioned at the trailing edge of the arm.

2. A rotary washer according to claim 1 in which the nozzles are formed of resin material.

3. A rotary washer according to claim 1 and further including a spindle for mounting the arm, the spindle being formed of resin material and having an interior hollow communicating with the interior hollow of the arm to supply washing liquid to the arm, and a rotative liquid seal between the resin material of the arm and the resin material of the spindle.

4. A rotary washer according to claim 1 and further in which the arm has an outboard tip portion tapered to a relatively sharp edge, and nozzles for delivering washing liquid from the tip portion of the arm, the sharp edge of the tip portion being recessed to accommodate the nozzles within the tip contour.

5. A rotary washer according to claim 1 in which the arm is mounted for rotation about an upright axis and in which the arm is positioned with its mean section line inclined upwardly at the blunt leading edge.

6. A rotary washer for granular material in a filter bed, comprising a rotatively mounted arm formed of resin material and having a streamlined cross section with a relatively blunt leading edge and a relatively sharp trailing edge, the arm having an interior hollow for washing liquid, and nozzles for the washing liquid communicating with said hollow and positioned at the trailing edge of the arm, the trailing edge being recessed to at least in part accommodate the nozzles within the streamlined cross sectional contour of the arm.

7. A rotary washer for granular material in a filter bed, comprising a rotatively mounted arm having an interior hollow for washing liquid and being formed of resin material with fiber reinforcement lying in the wall of the hollow arm, the hollow arm being of streamlined cross section with a blunt leading edge and sharp trailing edge, nozzle means at the trailing edge of the arm for delivering washing liquid from the interior hollow in the direction of the trailing edge of the arm to effect rotation thereof, and a bar comprising resin material bonded in the trailing edge of the arm, the means for delivering washing liquid from the interior hollow including passages extended through said bar.

8. A rotary washer according to claim 7 in which the nozzle means further includes nozzles formed of resin material and threaded in the passages in the bar.

9. A rotary washer for granular material in a filter bed, comprising a rotatively mounted arm formed of resin material and having a streamlined cross section with a relatively blunt leading edge and a relatively sharp trailing edge, the arm having an interior hollow for washing liquid, a spindle for mounting the arm, the spindle being formed of resin material and having an interior hollow communicating with the interior hollow of the arm to supply washing liquid to the arm, a rotative liquid seal between the resin material of the arm and the resin material of the spindle, and nozzles for the washing liquid communicating with said hollow and positioned at the trailing edge of the arm, the nozzles also being formed of resin material.

10. In filtering apparatus having a filter bed incorporating layers of different granular filtering media, a rotary washer comprising a hollow arm mounted for rotation substantially in the plane of an interface between layers of different filtering media, said arm having a streamlined cross section with a relatively blunt leading edge and a relatively sharp trailing edge, and nozzles for the washing liquid communicating with the hollow interior of the arm and positioned at the trailing edge of the arm.

11. In filtering apparatus having a filter bed incorporating layers of different granular filtering media, a rotary washer comprising a hollow arm mounted for rotation substantially in the plane of an interface between layers of different filtering media and having a streamlined cross section with a relatively blunt leading edge and a relatively sharp trailing edge, a nozzle for the washing liquid having a flow passage communicating with the hollow interior of the arm and having a discharge orifice positioned to discharge the washing liquid rearwardly from the trailing edge of the arm, and a check valve for said flow passage for blocking reverse flow of materials from the filter bed into the hollow interior of the arm.

12. Apparatus as defined in claim 11 in which the check valve is positioned within and intermediate the ends of said flow passage to thereby prevent abrasion of the valve upon rotation of the arm in the filtering media.

References Cited

UNITED STATES PATENTS

| 2,309,917 | 2/1943 | Palmer | 210—273 X |
| 2,880,874 | 4/1959 | Ferrara | 210—272 |
| 2,975,899 | 3/1961 | Cannon et al. | 210—415 X |
| 3,066,871 | 12/1962 | Born | 239—254 |
| 3,255,074 | 6/1966 | Salomon et al. | 210—415 X |
| 3,374,896 | 3/1968 | Palmer et al. | 210—273 X |

SAMIH N. ZAHARNA, Primary Examiner

U.S. Cl. X.R.

210—272, 273; 239—254, 262